(12) United States Patent
Boisson et al.

(10) Patent No.: US 7,411,028 B2
(45) Date of Patent: *Aug. 12, 2008

(54) PROCESS FOR PREPARING FUNCTIONALIZED POLYORGANOSILOXANE RESINS BY REDISTRIBUTION IN THE PRESENCE OF TRIFLIC ACID AND/OR OF AT LEAST ONE DERIVATIVE THEREOF AND OF A NONBASIC FILLER

(75) Inventors: Fernande Boisson, Villeurbanne (FR); Lucile Gambut, Lyons (FR); Gérard Mignani, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 123 days.

This patent is subject to a terminal disclaimer.

(21) Appl. No.: 10/509,060

(22) PCT Filed: Mar. 20, 2003

(86) PCT No.: PCT/FR03/00888

§ 371 (c)(1), (2), (4) Date: Jun. 17, 2005

(87) PCT Pub. No.: WO03/080710

PCT Pub. Date: Oct. 2, 2003

(65) Prior Publication Data

US 2005/0277730 A1     Dec. 15, 2005

(30) Foreign Application Priority Data

Mar. 26, 2002   (FR) .................................. 02 03769

(51) Int. Cl.
C08G 77/08 (2006.01)

(52) U.S. Cl. .............................. 528/23; 528/25; 528/31
(58) Field of Classification Search ........................ None
See application file for complete search history.

(56) References Cited

U.S. PATENT DOCUMENTS

| | | | |
|---|---|---|---|
| 2,676,182 A | 4/1954 | Daudt et al. | |
| 2,814,601 A | 11/1957 | Currie et al. | |
| 2,857,356 A | 10/1958 | Goodwin, Jr. | |
| 4,020,043 A | 4/1977 | Siefken | |
| 4,222,952 A | 9/1980 | Vick | |
| 4,448,927 A | 5/1984 | Falender et al. | |
| 4,707,531 A | 11/1987 | Shirahata | |
| 4,774,310 A * | 9/1988 | Butler | 528/23 |
| 4,963,438 A | 10/1990 | Weitemeyer et al. | |
| 5,223,595 A | 6/1993 | Stepp et al. | |
| 5,494,979 A * | 2/1996 | Ebbrecht et al. | 525/479 |
| 5,510,430 A | 4/1996 | Rubinsztajn et al. | |
| 5,527,873 A * | 6/1996 | Kobayashi et al. | 528/23 |
| 5,919,883 A * | 7/1999 | Dittrich et al. | 528/15 |
| 7,074,874 B2 * | 7/2006 | Kobayashi et al. | 528/34 |
| 2003/0109659 A1 | 6/2003 | Bordone et al. | |

FOREIGN PATENT DOCUMENTS

| | | |
|---|---|---|
| DE | 3 810 140 C1 | 10/1989 |
| FR | 2 303 040 | 10/1976 |
| WO | 01/44349 A1 | 6/2001 |

OTHER PUBLICATIONS

Patent Abstracts of Japan, vol. 011, No. 200 (C-431), Jun. 27, 1987 (abstract of JP 62 020531A).
Koppel et al., *J. Am. Chem. Soc.*, 116, 3047-3057 (1994), published by American Chemical Society, Washington, D.C.

* cited by examiner

*Primary Examiner*—Marc S Zimmer
(74) *Attorney, Agent, or Firm*—Buchanan, Ingersoll & Rooney, PC

(57) ABSTRACT

The invention provides a method for preparing functionalized polyorganosiloxane resins (POS) comprising units M: $(R_3SiO_{1/2})$, Q: $(SiO_{4/2})$ and M': $(Y_aR_{3-a}SiO_{1/2})$ and optionally D: $(R_2SiO_{2/2})$ and/or D': $(RYSiO_{2/2})$ and T: $(RSiO_{3/2})$ and/or T': $(YSiO_{3/2})$, wherein in said units R is $C_1$-$C_{10}$, alkyl or $C_8$-$C_{12}$, aryl and Y is a functional group (such as Si—H), by redistributing POS resins, using POSf bearing functional groups M' and/or D' and/or in the presence of an acid catalyst such as triflic acid or one of its derivatives and a non-basic inert filler: carbon black, diatomaceous earth, zeolite or acid or neutral oxide ($Al_2O_3$, $Na_2O$, $TiO_2$, MgO, silica). The invention also provides said catalyst system.

21 Claims, No Drawings

US 7,411,028 B2

PROCESS FOR PREPARING FUNCTIONALIZED POLYORGANOSILOXANE RESINS BY REDISTRIBUTION IN THE PRESENCE OF TRIFLIC ACID AND/OR OF AT LEAST ONE DERIVATIVE THEREOF AND OF A NONBASIC FILLER

CROSS-REFERENCE TO RELATED APPLICATIONS

This application is the U.S. national stage of International Appln. No. PCT/FR03/00888, filed Mar. 20, 2003, and claims priority under 35 U.S.C. § 119(a)-(d) of French Patent Application No. 02/03769, filed Mar. 26, 2002, said applications being incorporated by reference herein in their entireties and relied upon.

Reference is also made to commonly assigned application Ser. No. 10/509,071, which is the U.S. national stage of International Appln. No. PCT/FR03/00889, filed Mar. 20, 2003, and which is concurrently filed herewith.

The field of the invention is that of the production of silicone or polyorganosiloxane resins, referred to hereinbelow as POS resins. The POS resins more especially targeted are those comprising siloxyl units M: ($R_3SiO_{1/2}$) and optionally D: ($R_2SiO_{2/2}$) and/or T: ($RSiO_{3/2}$), said resins moreover being functionalized, i.e. they comprise units M': ($Y_aR_{3-a}SiO_{1/2}$) and optionally D': ($RYSiO_{2/2}$) and/or T: ($YSiO_{3/2}$); Y representing in these formulae a functional group, for example a hydrogen or a vinyl, R a hydrocarbon-based group and a=1 or 2.

These functional silicone resins MQ may be liquid or solid at room temperature. They have been known for a very long time and are currently used in many applications, for instance in electrical insulating varnishes, heat-resistant coatings, encapsulating materials for semiconductor components, etc.

The functional MQ POS resins (MM'Q) whose production forms the subject of the present invention may also comprise siloxyl units D and/or T, or even functionalized siloxyl units D' and/or T'.

The main routes of access to functional MQ resins are currently processes of condensation/-hydrolysis starting with sodium silicate or alkyl silicate (U.S. Pat. No. 2,676,182, U.S. Pat. No. 2,814,601, U.S. Pat. No. 2,857,356, U.S. Pat. No. 4,707,531). These techniques are not without drawbacks, especially in terms of ease of use, cost and production of ecotoxic and/or hazardous effluents.

However, an alternative, which is attractive in principle, to these condensation/hydrolysis techniques exists, namely the redistribution of POS oils in a POS resin comprising MQ units.

By way of illustration of this route of functionalization of resins of MQ type by redistribution, mention may be made of U.S. Pat. No. 4,774,310, U.S. Pat. No. 5,494,979 (≈EP-A-0 617 094) and U.S. Pat. No. 5,510,430.

Patent U.S. Pat. No. 4,774,310 describes the preparation of Si—H functionalized resins by redistribution of tetramethyldisiloxane (M'$_2$) in an MQ resin dissolved in an organic solvent, in the presence of triflic acid or perfluoroalkanesulfonic acid (TFOH). The reaction medium is heated to a temperature of between 50 and 100° C. and the triflic acid catalyst is then neutralized with NaHCO$_3$. The MM'Q resins thus obtained may react with organic or organosiloxane substances bearing olefin unsaturation (column 2, line 66 to column 3, line 3). Said patent also makes a vague and general allusion to supported acid catalysts (column 2, line 18).

Patent U.S. Pat. No. 5,494,979 (≈EP-A-0 617 094) discloses the preparation of MQ resins functionalized with acrylate radicals, by redistribution of polydiorganosiloxane oils bearing units D and units $D^{acrylate}$: $MD^{acrylate}_xD_yM$. This redistribution is performed using a xylene solution of commercial MQ resin, using triflic acid as preferred acid catalyst. The POS $MD^{acrylate}_xD_yM$ used is as described in example 2 of German patent 3 810 140. This preparation of acrylate-functionalized MQ resins also includes steps of neutralization, for example with sodium carbonate, and then of removal of the solid residues by filtration.

American patent U.S. Pat. No. 5,510,430 concerns the functionalization of resins of MQ type with a whole range of functional groups, for example aryl, alkyl, vinyl or Si—H. The functionalization process used is based on the redistribution of disiloxanes and chlorosilanes. The examples more specifically disclose the redistribution of MQ resins of formula: $[(CH_3)_3SiO_{1/2}]_{0.65}[SiO_{4/2}]_1$ dissolved in toluene, by placing in contact with tetramethyldisiloxane and an acid catalyst that may be a phosphonitrile chloride, a linear phosphazene or triflic acid (example 6). This is therefore a redistribution MQ+M'$_2$ at the reflux temperature of the solvent, with quenching of the reaction by using methanol, resulting in precipitation. Filtration and washing steps are then performed.

It emerges from this review of the prior art that the redistribution of MQ resins using functional oligo-organosiloxanes or functional polyorgano-siloxanes, in the presence of triflic acid, does not make reference to the use of any cocatalyst, and in any case does not at all mention the use of an inert filler such as carbon black in combination with triflic acid.

Moreover, it would be entirely desirable to improve the known processes, especially in terms of functionalization yields and degrees of conversion of the POSs used for functionalization (M'$_2$).

Under these circumstances, one of the essential objects of the present invention is to provide an improved process for functionalizing silicone resins comprising siloxyl units M and Q, by redistribution using POSs bearing functional units or units for functionalization; this improved process needing to afford improvements in terms of ease of use, significant increase in the degree of functionalization of the redistributed resin and also of the degree of conversion of the functional POS reagents, while at the same time keeping the cost of the process as low as possible.

Another essential objective of the invention is to provide a new acidic catalytic system, based on triflic acid or a derivative, which is useful or for the functionalization of silicone resins comprising units M and Q, by redistribution, using a redistribution reagent consisting of a POS bearing functional units or units for functionalization, said catalytic system having properties such that it allows an improvement in the redistribution kinetics and also in the yield and degree of conversion of the reaction, and does so without entailing any methodology complications or prohibitive cost increases.

Another essential objective of the invention is to significantly improve the homogeneous or heterogeneous catalysis of the reactions for functionalization of resins comprising siloxyl units M and Q by redistribution, using POSs bearing functional units or units for functionalization. The targeted improvement should be reflected in terms of the control, reliability and production efficiency of the corresponding industrial processes.

Another objective targeted through the improvement of the catalytic system is that of improving the quality of the functionalized MQ resins obtained, while at the same time optimizing the safety and minimizing the ecotoxic impact of the industrial processes under consideration.

Another essential objective of the invention is to provide a process for the functionalization of silicone resins MQ by redistribution, in which the yield of incorporation of the POS for functionalization (M'$_2$) is significantly increased relative to those obtained by the known processes.

Another essential objective of the invention is to provide a process for the functionalization of silicone resins MQ by redistribution using POS for functionalization, which process offers the possibility of controlling the content of functionalities introduced and also the location of these functions on the resin.

Another essential objective of the invention is to propose a process for the functionalization of silicone resins of MQ type by redistribution, this process being able to be applied to a wide variety of chemical functions, so as to be able to produce a large variety of functional MQ resins adapted to a host of applications, from a starting material consisting of a resin core on the periphery of which are placed selected chemical functions.

These objectives, among others, are achieved by the present invention, which relates firstly to a process for preparing functionalized polyorganosiloxane (POS) resins comprising units M: (R$_3$SiO$_{1/2}$), Q: (SiO$_{4/2}$) and M': (Y$_a$R$_{3-a}$SiO$_{1/2}$) and optionally D: (R$_2$SiO$_{2/2}$) and/or D': (RYSiO$_{2/2}$) and T: (RSiO$_{3/2}$) and/or T': (YSiO$_{3/2}$), with, in these units:

the radicals R, which may be identical or different, representing a C$_1$-C$_{10}$ alkyl or a C$_8$-C$_{12}$ aryl, the radicals Y being identical or different and representing a functional group Y, by redistribution of POS resins using POSf bearing functional units M' and/or D' and/or T', as defined above, in the presence of an acid catalyst, said process being characterized:

in that at least one catalyst is used of formula (I) below:

$$(C_mF_{2m+1}SO_2)_nA \qquad (I)$$

in which:

m is an integer greater than or equal to 1;

n is an integer equal to 1 or 2 and A represents OH, NH$_2$ or NH or CH$_2$ with:

(i) n=1 and A=OH or (ii) n=1 and A=NH$_2$ or NHR with R being a radical of SO$_2$-Z type with Z being a group other than C$_m$F$_{2m+1}$ (iii) n=2 and A=NH;

it is necessary for the acid catalyst to be liquid under the working conditions. Furthermore, the choice of the catalyst may be guided by the gas-phase acidity scale described by I. Koppel et al., J. Am. Chem. Soc., 116 (1994) 3047. Thus, the acids used should be those whose acidity measured in the gas phase is greater than that of sulfuric acid, thus, in terms of ΔG<302 Kcal/mol. For example, (CF$_3$SO$_2$)$_2$NH ΔG=292 Kcal/mol, (C$_4$F$_9$SO$_2$)$_2$NH ΔG=284 Kcal/mol;

and in that this catalyst is in the presence of a nonbasic inert filler.

The term "nonbasic" means more specifically and for example, for the purposes of the present invention, an inert filler that is incapable of reacting with the acid catalyst to neutralize it and make it "catalytically" less active or even inactive.

It is thus seen that one of the essential constituent means of the invention concerns the catalytic system formed by a combination of triflic acid or a derivative thereof with a nonbasic filler (or inert support).

Preferably, the nonbasic inert filler is chosen from the group of products comprising: carbon black, an acidic or neutral oxide, and mixtures thereof.

Even more preferably, the acidic or neutral oxide is selected from the group comprising: Al$_2$O$_3$, Na$_2$O, TiO$_2$, MgO, neutral or acidic zeolites, silica, and mixtures thereof.

The use of this catalytic system makes it possible to obtain yields for incorporation of POSs bearing functional units (for example M'$_2$) of greater than 50%, preferably 60% and even more preferably 70%, to be compared with yields obtained in the processes according to the prior art having an upper limit of 30%.

The performance qualities obtained by virtue of this combination of triflic acid or derivative/non-basic inert filler are entirely surprising and unexpected, not only in terms of yield of incorporation of POSf, but also as regards the degree of functionalization, i.e. the content of Si-function units in the resin MQ. Specifically, this degree is greater than 2.5% by weight and preferably greater than 3% in terms of the redistribution.

Moreover, the specifications of reduced cost, ease of use, safety and limited or even zero ecotoxicity are largely satisfied by the process according to the invention.

The catalytic system according to the invention is also noteworthy in terms of kinetics.

Furthermore, the redistribution may be readily stopped by neutralization of the acid catalyst using a base (for example NaHCO$_3$, Na$_2$CO$_3$, CaCO$_3$) and/or by deactivation by heat and/or by adsorption (carbon black, diatomaceous earth, etc.).

The neutralization is all the more simple since the residual acidity in this case is markedly lower than that obtained after conventional redistribution catalysis. In addition, the neutralization has the advantage that the final reaction medium is not corrosive toward the functionalized MQ silicone resins. The stability of these resins with respect to temperature and storage is thereby greater.

Still regarding this stability aspect of the redistributed resin, it may also be pointed out that, since the catalytic system is present in trace amount in the reaction medium, it is nondegrading with respect to the products used and/or the products obtained after redistribution.

This process also makes it possible to control the degree of functionalization of the MQ resin, or even the location of its functions on the resin. Thus, starting with an MQ resin core, for convenience, it is possible to construct around this core a functional peripheral structure, by customizing the morphology and hydrodynamic volume of the resin. For example, it may be envisaged to produce on the core hair made of POS segments of (D)$_x$ type.

The functions that may be incorporated into the resin are, for example, of Si—H, Si-Vi, Si-phenyl, Si-alkyl, Si-alkenyl, Si-alkyne, Si-alkyl halide, Si-alkyl epoxide, Si-alkyl-polyether, Si-carbinol, Si-alkylammonium, Si-alkylcarboxylic acid or Si-alkylthiol type. It may thus be hoped to be able to provide functional resins adapted to a host of applications.

In point of fact, it may be envisaged to provide a tree produced from an industrial MQ-based resin.

Thus, the functions provided by the POSf are such that Y is advantageously chosen from the group comprising:

hydrogen an alkenyl an alkynyl an aryl (preferably a phenyl)
an (alkyl)epoxy
an ether or a polyether
a carboxylic acid
an amide
an amine
a halide
an alcohol
a thiol or any other sulfur derivative.

In accordance with the invention, the starting MQ resins may be either unfunctionalized or already functionalized.

As regards the unfunctionalized MQ resins, they are commercial products, for example of formula $(M_xQ_y)_z$ with x between 0.5 and 1 and y between 0 and 1.

The already-functionalized MQ resins are especially those obtained by the process in accordance with the present invention from unfunctionalized starting MQ resins or by the synthetic process starting with sodium silicate described in patent U.S. Pat. No. 2,676,182.

Advantageously, the starting MQ resin is in the form of a solution in an organic solvent, for instance xylene or toluene, or as a solution in the POSf oil for functionalization.

As regards the nonbasic inert filler, it is a fine powder, i.e. the particle size of which is such that the grains are between 0.001 and 300 μm.

It is, for example, $Al_2O_3$, $Na_2O$, $TiO_2$, MgO, zeolite, silica, diatomaceous earth or carbon black (the latter filler being preferred), which is in the form of powder, granules or any other molded form. In practice, powdered carbon black is dispersed into the POSf oil for functionalization.

As specifically regards these POSfs bearing functional units M' and/or D' and/or T', which are useful for the redistribution, it will be preferred to use those of formula (IV.1) or (IV.2) below:

(IV.1):

$(Y_aR_{3-a}Si)_2O$  or (IV.2):

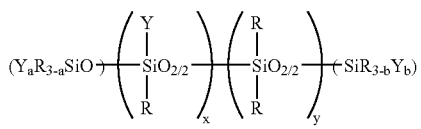

(IV.3):

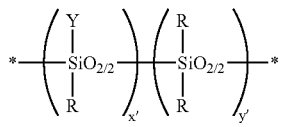

in which:
Y and R are as defined above,
a and b=0 to 2,
$0 \leq x \leq 200$ and preferably $0 \leq x \leq 50$,
$0 \leq y \leq 200$ and preferably $0 \leq y \leq 50$,
with the condition that if x+y=0, then a and/or b≠0,
$1 \leq x' \leq 10$ and preferably $1 \leq x' \leq 8$,
$0 \leq y' \leq 10$ and preferably $0 \leq y' \leq 3$,
$3 \leq x'+y' \leq 10$ and preferably x'+y'=3, 4 or 5.

The POSfs of formulae (IV.1), (IV.2) and (IV.3) correspond, respectively, to disiloxanes, linear polyorganosiloxanes and cyclic oligoorganosiloxanes.

These POSfs are, for example, $M_2$, $M_2^{Vi}$, $MD_xM$, $MD_xD'_yM$, $M'D_xD'_yM'$, $MD_xD^{Vi}_yM$, $M^{Vi}D_xD^{Vi}_yM^{Vi}$, $M'D_xM'$, $M^{Vi}D_xM^{Vi}$.

It should be noted, as regards the acid catalyst of formula (I)(i)(ii) or (iii) that the fluoro chain $C_mF_{2m+1}$ may be extended so as to increase the acidity of the catalyst and subsequently its efficacy.

In practice, the acid catalysts may be, for example:
(i) n=1 and A=OH
(ii) n=1 and A=$NH_2$ or NHR with R being a radical of $SO_2$-Z type with Z being a group other than $C_mF_{2m+1}$
(iii) n=2 and A=NH.

In the preferred embodiment of the process according to the invention, the catalyst is triflic acid of formula (I)(i) with m=1 and/or the trifluoro-methanesulfonimide acid of formula (I)(iii) with m=1.

In quantitative terms, it may be pointed out that the concentration of acid catalyst (I) is advantageously between 1 ppm and 2% relative to the starting resin. Moreover, the catalyst (I)/inert support (preferably carbon black) mass ratio is preferably between 0.1 and 10, and is preferably of the order of 1.

In accordance with the invention and according to one preferred embodiment, the nonbasic inert filler is not linked to the acid catalyst (I) (triflic acid or derivatives). They cohabit separately of each other in the reaction medium.

The catalyst may be homogeneous or heterogeneous. It is preferably homogeneous, the catalyst being in this case dissolved in the reaction medium.

According to a first variant of heterogeneous catalysis, the nonbasic inert filler may be an inert support onto which the catalyst is at least partially absorbed or is intended to be at least partially absorbed.

According to a second variant of heterogeneous catalysis, the catalyst is at least partially absorbed onto an inert support other than the nonbasic inert filler, this filler being moreover present in the reaction medium. It is necessary for the acid catalyst to be liquid under the working conditions. However, it may be solid at 25° C. and molten at the reaction temperature.

The third variant of heterogeneous catalysis corresponds to a combination of the first and second variants.

The process according to the invention may be defined by other methodological characteristics, and in particular in that it comprises the following essential steps:

1—combining the starting POS resin, the POSf bearing functional units, the acid catalyst (I) and the nonbasic inert filler ($Al_2O_3$, $Na_2O$, $TiO_2$, MgO, silica, diatomaceous earth, zeolite or carbon black, the latter filler being preferred), in an organic solvent;

2—reacting preferably at a temperature θr greater than or equal to room temperature and less than or equal to the boiling point of the solvent, and even more preferably between 50° C. and 100° C.;

3—optionally quenching the reaction by adding an agent for neutralizing the acid catalyst (I);

4—removing the inert filler (advantageously the carbon black) from the reaction medium, preferably by filtration.

Advantageously, as has already been mentioned above, the organic solvent, preferably xylene, toluene or white spirit, is provided in the reaction medium by means of a solution of starting POS resin (MQ) in said solvent. It is also possible to work with an excess of functionalized silicone oil.

According to another advantageous embodiment, the non-basic inert filler, preferably the carbon black, is in the form of powder dispersed in the POSf bearing functional units.

The process of functionalization by redistribution according to the invention makes it possible especially to graft Si—H and/or Si-alkenyl (preferably vinyl) units onto MQ resins. Given that these functions H or alkenyl are reactive functions, among others, it may be envisaged, in accordance with the invention, to perform a second functionalization according to a hydrosilylation mechanism, so as to covalently attach a second functional segment onto the already functionalized MQ resin.

This corresponds to the case in which Y represents H or alkenyl in the functional units M' and/or D' and/or T', of the POSf. In this variant, after the redistribution, other functionalization radicals $Y_1$ bearing at least one unsaturation (preferably ethylenic) or at least one Si—H unit are grafted onto the ≡Si—H or ≡Si-alkenyl units, respectively, of the redistributed resin.

As regards the methodology, it may also be pointed out that it is preferable, in order for the redistribution to proceed correctly, for the reaction atmosphere to be free of moisture. Thus, the process is advantageously performed under an atmosphere of neutral gas, for example argon or nitrogen.

The reaction pressure is advantageously normal and the reaction temperature may range from room temperature (for example 25° C.) to a temperature of 150° C. or more.

The redistribution is stopped by means of deactivating the catalyst. Since it is an acid catalyst, in this instance triflic acid or derivatives thereof, the deactivation may be performed using a basic neutralizer, for instance sodium carbonate $Na_2CO_3$ or sodium bicarbonate $NaHCO_3$.

The neutralization is all the more necessary when the catalysis is homogeneous catalysis, since, in such a case, in contrast to heterogeneous catalysis, the catalyst is not removed at the end of the reaction.

According to one variant of the process in accordance with the invention, the redistributed and functionalized resin obtained is subjected to at least one other redistribution/functionalization, using POS bearing functional units.

The invention also relates to a catalytic system that is useful for preparing functionalized polyorganosiloxane (POS) resins comprising units M: $(R_3SiO_{1/2})$, Q: $(SiO_{4/2})$ and M': $(Y_aR_{3-a}SiO_{1/2})$ and optionally D: $(R_2SiO_{2/2})$ and/or D': $(RYSiO_{2/2})$ and/or T: $(RSiO_{3/2})$ and/or T': $(YSiO_{3/2})$ with, in these units:

the radicals R being identical or different and representing a $C_1$-$C_{10}$ alkyl or a $C_8$-$C_{12}$ aryl;

the radicals Y being identical or different and representing a functional group Y, preferably chosen from the group comprising:
hydrogen
an alkenyl
an alkynyl
an aryl (preferably a phenyl)
an (alkyl)epoxy
an ether or a polyether
a carboxylic acid
an amide
an amine
a halide
an alcohol
a thiol or any other sulfur derivative by redistribution of POS resins using POSs bearing functional units M' and/or D' and/or T' as defined above, characterized in that it comprises:

-A- at least one catalyst of formula (I) below:

$$(C_mF_{2m+1}SO_2)_nA \qquad (I)$$

in which:

m is an integer greater than or equal to 1;

n is an integer equal to 1 or 2 and A represents OH, $NH_2$ or NH with:
 (i) n=1 and A=OH
 (ii) n=1 and A=$NH_2$ or NHR with R being a radical of $SO_2$-Z type with Z being a group other than $C_mF_{2m+1}$
 (iii) n=2 and A=NH;

-B- and at least one nonbasic inert filler preferably chosen from the group of products comprising: carbon black, an acidic or neutral oxide (preferably selected from the group comprising: $Al_2O_3$, $Na_2O$, $TiO_2$, MgO, zeolite, silica, diatomaceous earth, carbon black, and mixtures thereof), and mixtures thereof.

This catalytic system is markedly more efficient than the conventional catalysts for the redistribution of silicone resins MQ using only TFOH or TFSI. In terms of kinetics, conversion and yield, it makes it possible to obtain high-quality functionalized MQ resins, the functionality of which is controlled and adapted to the intended use. These performance qualities are all the more advantageous since they are obtained without sacrificing the imperatives of cost, safety, absence of ecotoxicity and ease of use.

The examples that follow will make it possible to understand more clearly the process and the catalyst according to the invention, by highlighting all their advantages and the possible implementation variants.

EXAMPLES

I—Comparative Example

Tonsil Catalyst 500 g of a xylene solution containing 300 g of resin $(MQ_y)_z$ (structure determined by $^{29}Si$ NMR: $(M_{0.88}M'_{0.06}D^*_{0.05}Q_1^*)_z$-M/Q=0.9) are introduced into a 1 liter reactor under nitrogen. 30 g of $M'_2$ (1.49 mol SiH/kg of resin) and 2.7 g of Tonsil are added. The mixture is brought to 70° C. and heated at this temperature for 7 hours. After cooling to room temperature, the reaction mass is filtered through cardboard and then through a 0.45 μm PTFE filter to remove the Tonsil. During the test, several samples are taken and make it possible to monitor the amount of SiH bound to the resin and also the nature and relative proportions of the light fractions in the reaction medium as a function of the reaction time.

TABLE 1

| | Reaction time | | | | |
|---|---|---|---|---|---|
| | 0 h | 1 h | 3 h | 6 h | 7 h |
| Amount of SiH on the resin (quantification by IR) | 0% | 0.8% | 1.2% | 1.47% | 1.39% |
| Conversion of $M'_2$ (quantification by GC) | 0% | 52% | 74% | 78% | 82% |

Final structure of the resin ($^{29}Si$ NMR): $(M_{0.82}M'_{0.08}D^*_{0.05}Q^*)_z$ Final yield of incorporation of SiH: 32%.

II—Comparative Example

$H_2SO_4$+Black Catalyst

The operating conditions are the same as those described in example I.
Materials added:
- 491.26 g of xylene solution, i.e.
- 304.6 g of resin
- 30.1 g of M'$_2$, i.e. 1.44 mol/kg of resin
- 0.44 g of $H_2SO_4$
- 0.60 g of Black 4S Reaction time: 7 hours
Monitoring of the reaction:

TABLE 2

|  | Reaction time | | | | |
|---|---|---|---|---|---|
|  | 0 h | 1 h | 3 h | 6 h | 7 h |
| Amount of SiH on the resin (quantification by IR) | 0% | 0.38% | 0.73% | 0.89% | 1.00% |
| Conversion of M'$_2$ (%) (quantification by GC) | 0% | 33% | 58.5% | 68% | 70% |

Final structure of the resin ($^{29}$Si NMR): $M_{0.79}M'_{0.03}D*_{0.06}Q*$
Final yield of incorporation of SiH: 25%.

III—Example

$CF_3SO_3H$ Catalyst

The operating conditions are the same as those described in example I.
Materials added:
- 500.0 g of xylene solution, i.e.
- 300 g of resin
- 30.0 g of M'$_2$, i.e. 1.47 mol/kg
- 1.31 g of $CF_3SO_3H$ Reaction time: 7 hours
Monitoring of the reaction:

TABLE 3

|  | Reaction time | | | | |
|---|---|---|---|---|---|
|  | 0 h | 1 h | 3 h | 6 h | 7 h |
| Amount of SiH on the resin (quantification by KOH assay) | 0% | 2.79% | 3.17% | 3.08% | 3.28% 3.37% (IR) |
| Conversion of M'$_2$ (%) (quantification by GC) | 0% | 94.5% | 97% | 97% | 97% |

Final structure of the resin ($^{29}$Si NMR): $(M_{0.72}M'_{0.11}D*_{0.04}Q*)_z$
Final yield of incorporation of SiH: 75%.

IV—Example

$CF_3SO_3H$+Black 4S Catalyst

The operating conditions are the same as those described in example I.
Materials added:
- 490.8 g of xylene solution, i.e.
- 304.3 g of resin
- 30.1 g of M'$_2$, i.e. 1.49 mol/kg
- 1.28 g of $CF_3SO_3H$
- 1.83 g of Black 4S Reaction time: 7 hours
Monitoring of the reaction:

TABLE 4

|  | Reaction time | | | | |
|---|---|---|---|---|---|
|  | 0 h | 1 h | 3 h | 6 h | 7 h |
| Amount of SiH on the resin (quantification by KOH assay) | 0% | 1.79% | 3.05% | 3.14% | 3.18% 3.05% (IR) |
| Conversion of M'$_2$ (%) (quantification by GC) | 0% | 81% | 96% | 97% | 97% |

Final structure of the resin ($^{29}$Si NMR): $(M_{0.72}M'_{0.14}D*_{0.05}Q*)_z$
Final yield of incorporation of SiH: 73%.

V—Comparative Test

Tonsil Catalyst 500 g of a xylene solution containing 300 g of resin $(M_xQ_y)_z$ (NMR analyses: $M_{0.9}D_{0.02}Q_1$ with M/Q=0.9 (molar)) are introduced into a 3 liter reactor under nitrogen. This solution is brought to 70° C. and 30 g (1.49 mol SiH/kg of resin) of M'$_2$ and 2 g of Tonsil are added. The mixture is left to react for 7 hours at 70° C. The reaction mass is cooled and filtered through cardboard+0.45 µm PTFE filter to remove the Tonsil. During this test, a certain number of samples are taken, which make it possible to monitor the amount of SiH units as a function of time:

T=0: 0%, T=1 h: 0.8%, T=3 h: 1.2%, T=7 h: 1.47%, or 1.39% (IR), i.e. 0.48 mol SiH/kg of resin.

The yield for incorporation of the SiH units is 32%. The NMR analyses show that the structure of the final resin is: $(M_{0.8}M'_{0.07}D*_{0.04}Q_1)_z$.

VI—$H_2SO_4$-Black Catalysis Test

Same operating conditions as for example I:
- 500 g of xylene solution containing 300 g of resin $(M_xQ_y)_z$
- 30 g of M'$_2$, i.e. 1.49 mol of SiH/kg of resin
- 1.09 g of $H_2SO_4$
- 1.39 g of Black 2S ⇒reaction time: 8 hours→SiH IR assay: 1.24%, i.e. 0.43 mol SiH/kg of resin
⇒yield of SiH incorporation: 29%
⇒final resin structure: $(M_{0.8}M'_{0.05}D*_{0.08}Q_1)_z$

VII—$CF_3SO_3H$ Catalysis Test

Same operating conditions as for example I:
- 642.1 g of xylene solution containing 400 g of resin $(M_xQ_y)_z$
- 47.21 g of $M^{Vi}_2$, i.e. 1.27 mol of Si-vinyl/kg of resin
- 2.45 g of carbon black
- 1.71 g of $CF_3SO_3H$ ⇒reaction time: 8 hours 10 minutes→IR assay: 1.1 mol Si-vinyl/kg of resin
⇒yield of SiH incorporation: 87%
⇒final resin structure: $(M_{0.76}M^{Vi}_{0.11}D*_{0.03}Q_1)_z$.

The invention claimed is:

1. A process for preparing functionalized polyorganosiloxane (POS) resins comprising units M: $(R_3SiO_{1/2})$, Q: $(SiO_{4/2})$ and M': $(Y_aR_{3-a}SiO_{1/2})$ and optionally D: $(R_2SiO_{2/2})$ and/or D': $(RYSiO_{2/2})$ and T: $(RSiO_{3/2})$ and/or T': $(YSiO_{3/2})$, wherein:
the radicals R, which are identical or different, represent $C_1$-$C_{10}$ alkyl or $C_8$-$C_{12}$ aryl; and
the radicals Y, which are identical or different, represent a functional group Y selected from the group consisting of hydrogen, alkenyl, alkynyl, aryl, (alkyl)epoxy, ether, polyether, carboxylic acid, amide, amine, halide, alcohol, thiol and other sulfur derivative;
said process comprising conducting a redistribution reaction between a POS resin and a POSf compound bearing functional units M' and/or D' and/or T', as defined above, in the presence of an acid catalyst, wherein:
at least one catalyst has formula (I) below:

$$(C_mF_{2m+1}SO_2)_nA \qquad (I)$$

wherein:
m is an integer greater than or equal to 1;
n is an integer equal to 1 or 2 and A represents OH, $NH_2$ or NH with:
(i) n=1 and A=OH; or
(ii) n=1 and A=$NH_2$ or NHR with R being a radical of $SO_2$-Z type, with Z being a group other than $C_mF_{2m+1}$; or
(iii) n=2 and A=NH;
and wherein said catalyst is in the presence of a nonbasic inert filler;
wherein the redistributed and functionalized resin obtained is subjected to at least one other redistribution/functionalization, using POSfs bearing functional units.

2. The process as claimed in claim 1, wherein the nonbasic inert filler is carbon black, a diatomaceous earth, or an acidic or neutral oxide, or a mixture thereof.

3. The process as claimed in claim 2, wherein the acidic or neutral oxide is $Al_2O_3$, $Na_2O$, $TiO_2$, MgO, silica or zeolite, or a mixture thereof.

4. The process as claimed in claim 1, wherein Y is phenyl.

5. The process as claimed in claim 1, wherein the catalyst is triflic acid (TFOH) of formula (I) (i) with m=1 and/or the trifluoromethanesulfonimide acid (TFSI) of formula (I) (iii) with m=1.

6. The process as claimed in claim 2, wherein the catalyst is triflic acid (TFOH) of formula (I) (i) with m=1 and/or the trifluoromethanesulfonimide acid (TFSI) of formula (I) (iii) with m=1.

7. The process as claimed in claim 1, wherein the catalyst is supported on the nonbasic inert filler, the concentration of acid catalyst (I) is between 1 ppm and 2% by weight relative to the starting resin and wherein the catalyst (I)/inert filler support mass ratio is between 0.1 and 10.

8. The process as claimed in claim 7, wherein the inert filler support is carbon black.

9. The process as claimed in claim 7, wherein the catalyst (I)/inert filler support mass ratio is of the order of 1.

10. The process as claimed in claim 9, wherein the inert filler support is carbon black.

11. The process as claimed in claim 7, wherein the catalyst is triflic acid (TFOH) of formula (I) (i) with m=1 and/or the trifluoromethanesulfonimide acid (TFSI) of formula (I) (iii) with m=1.

12. The process as claimed in claim 11, wherein the inert filler support is carbon black.

13. The process for preparing functionalized polyorganosiloxane (POS) resins comprising units M: $(R_3SiO_{1/2})$, Q: $(SiO_{4/2})$ and M': $(Y_aR_{3-a}SiO_{1/2})$ and optionally D: $(R_2SiO_{2/2})$ and/or D': $(RYSiO_{2/2})$ and T: $(RSiO_{3/2})$ and/or T': $(YSiO_{3/2})$, wherein:
the radicals R, which are identical or different, represent $C_1$-$C_{10}$ alkyl or $C_8$-$C_{12}$ aryl; and
the radicals Y, which are identical or different, represent a functional group Y selected from the group consisting of hydrogen, alkenyl, alkynyl, aryl, (alkyl)epoxy, ether, polyether, carboxylic acid, amide, amine, halide, alcohol, thiol and other sulfur derivative;
said process comprising conducting a redistribution reaction between a POS resin and a POSf compound bearing functional units M' and/or D' and/or T', as defined above, in the presence of an acid catalyst, wherein:
at least one catalyst has formula (I) below:

$$(C_mF_{2m+1}SO_2)_nA \qquad (I)$$

wherein:
m is an integer greater than or equal to 1;
n is an integer equal to 1 or 2 and A represents OH, $NH_2$ or NH with:
(i) n=1 and A=OH; or
(ii) n=1 and A=$NH_2$ or NHR with R being a radical of $SO_2$-Z type, with Z being a group other than $C_mF_{2m+1}$; or
(iii) n=2 and A=NH;
and wherein said catalyst is in the presence of a nonbasic inert filler;
said process comprising the following essential steps:
(1) combining the starting POS resin, the POSf bearing functional units, the acid catalyst (I) and the nonbasic inert filler in an organic solvent;
(2) reacting at a temperature θr greater than or equal to room temperature and less than or equal to the boiling point of the solvent;
(3) optionally quenching the reaction by adding an agent for neutralizing the acid catalyst (I); and
(4) removing the inert filler from the reaction medium;
wherein the redistributed and functionalized resin obtained is subjected to at least one other redistribution/functionalization, using POSfs bearing functional units.

14. The process as claimed in claim 13, wherein the inert filler comprises carbon black, and/or wherein the reaction temperature is between 50° C. and 100° C., and/or wherein the inert filler is removed from the reaction medium by filtration.

15. The process as claimed in claim 13, wherein the acid catalyst is triflic acid (TFOH) of formula (I) (i) with m=1 and/or the trifluoromethanesulfonimide acid (TFSI) of formula (I) (iii) with m=1.

16. The process as claimed in claim 15, wherein the inert filler comprises carbon black, and/or wherein the reaction temperature is between 50° C. and 100° C., and/or wherein the inert filler is removed from the reaction medium by filtration.

17. The process as claimed in claim 13, wherein the organic solvent is provided in the reaction medium by means of a solution of starting POS resin in said solvent, and wherein the nonbasic inert filler is in the form of powder dispersed in the POSf bearing functional units.

18. The process as claimed in claim 13, wherein the organic solvent is xylene or toluene, and/or wherein the nonbasic inert filler is carbon black.

19. A process for preparing functionalized polyorganosiloxane (POS) resins comprising units M: $(R_3SiO_{1/2})$, Q:

($SiO_{4/2}$) and M': ($Y_aR_{3-a}SiO_{1/2}$) and optionally D: ($R_2SiO_{2/2}$) and/or D': ($RYSiO_{2/2}$) and T: ($RSiO_{3/2}$) and/or T': ($YSiO_{3/2}$), wherein:

the radicals R, which are identical or different, represent $C_1$-$C_{10}$ alkyl or $C_8$-$C_{12}$ aryl; and the radicals Y, which are identical or different, represent a functional group Y selected from the group consisting of hydrogen, alkenyl, alkynyl, aryl, (alkyl)epoxy, ether, polyether, carboxylic acid, amide, amine, halide, alcohol, thiol and other sulfur derivative;

said process comprising conducting a redistribution reaction between a POS resin and a POSf compound bearing functional units M' and/or D' and/or T', as defined above, in the presence of an acid catalyst, wherein:

at least one catalyst has formula (I) below:

$$(C_mF_{2m+1}SO_2)_nA \qquad (I)$$

wherein:
m is an integer greater than or equal to 1;
n is an integer equal to 1 or 2 and A represents OH, $NH_2$ or NH with:
(i) n=1 and A=OH; or
(ii) n=1 and A=$NH_2$ or NHR with R being a radical of $SO_2$-Z type, with Z being a group other than $C_mF_{2m+1}$; or
(iii) n=2 and A=NH;

and wherein said catalyst is in the presence of a nonbasic inert filler;

wherein Y=H or alkenyl in the functional units M' and/or D' and/or T' of the POSf, and wherein, after the redistribution, other functionalization radicals $Y_1$ bearing at least one unsaturation or at least one Si—H unit are grafted by hydrosilylation onto the ≡Si—H or ≡Si-alkenyl units, respectively, of the redistributed resin;

wherein the redistributed and functionalized resin obtained is subjected to at least one other redistribution/functionalization, using POSfs bearing functional units.

20. The process as claimed in claim 19, wherein other functionalization radicals $Y_1$ bearing at least one ethylenic unsaturation are grafted by hydrosilylation onto the ≡Si—H or ≡Si-alkenyl units, respectively, of the redistributed resin.

21. A process for preparing functionalized polyorganosiloxane (POS) resins comprising units M: ($R_3SiO_{1/2}$), Q: ($SiO_{4/2}$) and M': ($Y_aR_{3-a}SiO_{1/2}$) and optionally D: ($R_2SiO_{2/2}$) and/or D': ($RYSiO_{2/2}$) and T: ($RSiO_{3/2}$) and/or T': ($YSiO_{3/2}$), wherein:

the radicals R, which are identical or different, represent $C_1$-$C_{10}$ alkyl or $C_8$-$C_{12}$ aryl; and the radicals Y, which are identical or different, represent a functional group Y selected from the group consisting of hydrogen, alkenyl, alkynyl, aryl, (alkyl)epoxy, ether, polyether, carboxylic acid, amide, amine, halide, alcohol, thiol and other sulfur derivative;

said process comprising conducting a redistribution reaction between a POS resin and a POSf compound bearing functional units M' and/or D' and/or T', as defined above, in the presence of an acid catalyst, wherein:

at least one catalyst has formula (I) below:

$$(C_mF_{2m+1}SO_2)_nA \qquad (I)$$

wherein:
m is an integer greater than or equal to 1;
n is an integer equal to 1 or 2 and A represents OH, $NH_2$ or NH with:
(i) n=1 and A=OH; or
(ii) n=1 and A=$NH_2$ or NHR with R being a radical of $SO_2$-Z type, with Z being a group other than $C_mF_{2m+1}$; or
(iii) n=2 and A=NH;

and wherein said catalyst is in the presence of a nonbasic inert filler;

said process comprising the following essential steps:
(1) combining the starting POS resin, the POSf bearing functional units, the acid catalyst (I) and the nonbasic inert filler in an organic solvent;
(2) reacting at a temperature θr greater than or equal to room temperature and less than or equal to the boiling point of the solvent;
(3) optionally quenching the reaction by adding an agent for neutralizing the acid catalyst (I); and
(4) removing the inert filler from the reaction medium;

wherein Y=H or alkenyl in the functional units M' and/or D' and/or T' of the POSf, and wherein, after the redistribution, other functionalization radicals $Y_1$ bearing at least one unsaturation or at least one Si—H unit are grafted by hydrosilylation onto the ≡Si—H or ≡Si-alkenyl units, respectively, of the redistributed resin;

wherein the redistributed and functionalized resin obtained is subjected to at least one other redistribution/functionalization, using POSfs bearing functional units.

* * * * *